UNITED STATES PATENT OFFICE.

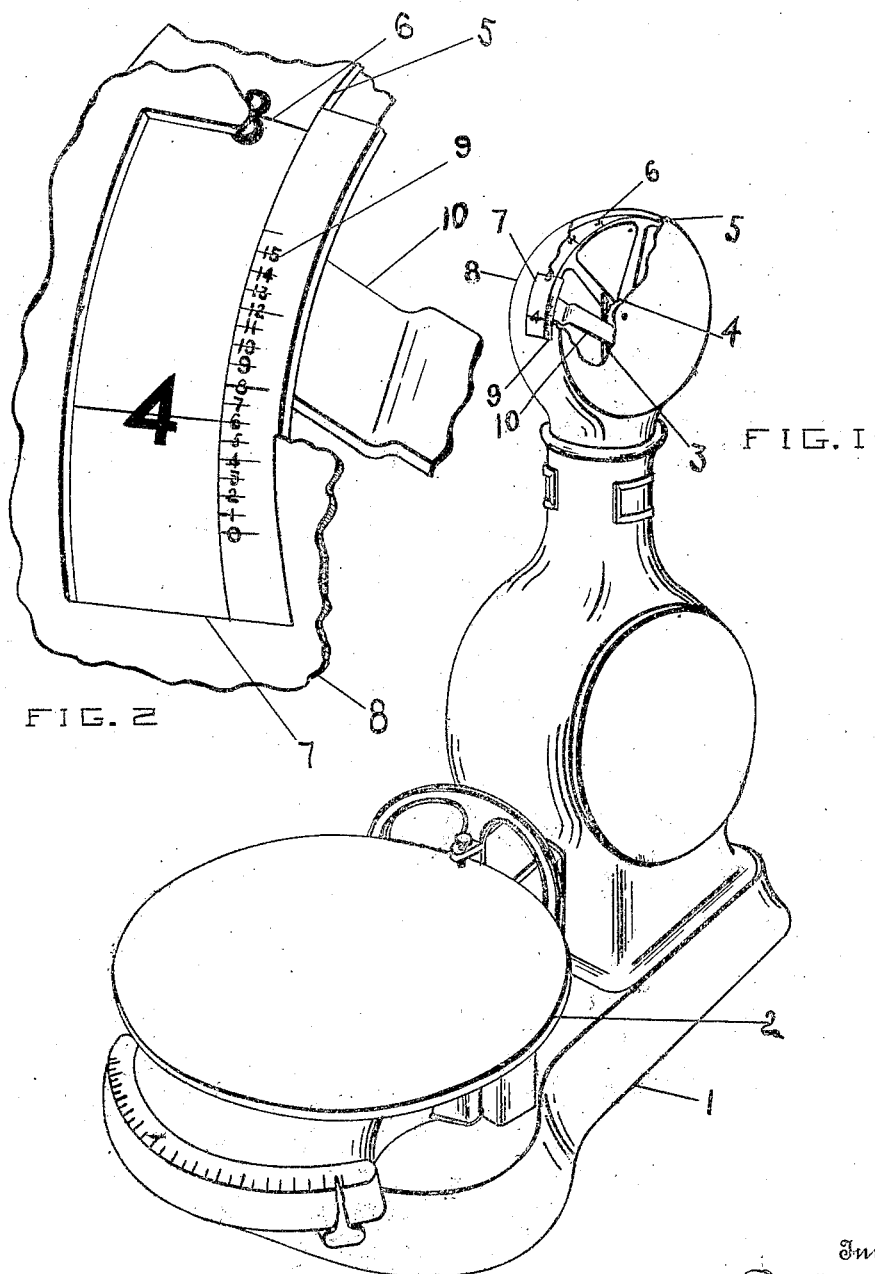

EDMUND S. CHURCH, OF DAYTON, OHIO, ASSIGNOR TO THE TOLEDO COMPUTING SCALE COMPANY, OF TOLEDO, OHIO, A CORPORATION OF NEW JERSEY.

WEIGHT-MEASURING INSTRUMENT.

1,013,641.    Specification of Letters Patent.    Patented Jan. 2, 1912.

Application filed May 27, 1910. Serial No. 563,683.

*To all whom it may concern:*

Be it known that I, EDMUND S. CHURCH, a citizen of the United States, residing at Dayton, Ohio, have invented new and useful Weight-Measuring Instruments, of which the following is a specification.

My invention relates more particularly to weighing devices or balances and has for its object to facilitate the reading of the weight indications. In the ordinary devices of this character a chart is employed which carries all the weight indications, not only those denoting larger units but also those denoting the smaller units or fractions thereof, and a hand or pointer coöperates with such chart, the parts being relatively movable, either the pointer moving over the chart or the chart moving with reference to the pointer. The pointer is necessarily elevated more or less from the surface of the chart and by reason of this fact the reading taken off varies somewhat according to the position of the reader or in other words according to the angle of the line of vision to the surface of the chart at the reading position.

In my improved balance the larger units are arranged on a movable chart or scale and the smaller units or sub-divisions on a stationary chart past which the former is moved by the weight imposed upon the scale pan, the scales being arranged edge to edge or in the same geometrical surface. By this arrangement the inaccuracy of reading heretofore adverted to is obviated and the reading of the scale is facilitated and confusion caused by the presence of the subdivision markings is prevented.

I have illustrated my invention in connection with a scale in which the movable member of the indicator or chart is cylindrical, but it will be obvious that the invention is applicable to other forms of balances or weighing devices.

In the drawing forming part of the application, Figure 1 is a perspective view of a scale embodying my improvement, parts of the cylindrical casing being broken away to show the interior thereof; Fig. 2 is a fragmentary view also in perspective of the indicating means on a larger scale.

In the embodiment of my invention illustrated in the drawing the usual frame 1 carries the weighing mechanism, including the scale pan 2 and a cylindrical casing 8 in which the cylindrical chart 6 is inclosed. The latter is provided with a pinion 4 rigidly connected thereto, which is engaged by a rack 3 connected by suitable means with the beam of the balance.

The mechanism so far as now described is well known in the art and I claim no novelty therein but my invention resides in the features to be now described.

The casing 8 is formed with a sight opening 7 which is so located as to reveal a small section of the periphery of the rotary drum 5. The latter is provided with a circumferential series of numerals and division lines indicating the larger units employed which in the present case are pounds. The drum does not completely fill the entire width of the opening, however, but the part uncovered thereby is occupied by a strip 9 flush with the surface of the drum but held stationary by an arm 10. Upon the strip is engraved or otherwise formed a scale indicating the lesser subdivisions or units employed which in the case shown are ounces or sixteenths of a pound. Each series of numerals ascends in the direction of rotation of the drum when a weight is placed upon the scale pan and for convenience of reading is provided with graduation marks as shown. The distance between successive numerals of the movable scale is equal to the entire length of the fractional scale and there will therefore be always some numeral of the former series opposite the latter.

The operation of the scale is apparent from what has been said. When the weight is placed upon the pan the drum revolves as usual until the weight unit nearest but less than the weight of the material in the pan appears opposite the stationary scale. The graduation mark corresponding to the larger weight unit will come to rest opposite that fractional indication which indicates or corresponds to the excess of the weight of material in the pan over the larger weight unit. As shown in Fig. 2 for example, the scale reads 4 pounds, 6 ounces, but if the article in the pan weighed a greater or less amount the graduation mark through the numeral 4 would come to rest at a corresponding point above or below the numeral 6 in the stationary scale. The two scales being arranged side by side and flush with each other, variation in the reading due to the angle from the eye of the observer is obviated and by reason of the absence of subdivisions between the units on the rotary drum the reading is much facilitated and it is found in practice that the eye becomes accustomed to the fixed position of the fractional divisions which are therefore more easily and quickly read.

What I claim is:

1. In a device of the class described, a movable scale controlled by the weight in the pan, a stationary scale substantially parallel to the movable scale and past which the latter moves one of the scales bearing a series of larger weight indications only and the other a series of indications fractional with respect to the indications of the first mentioned scale, the two series of indications being parallel to each other and to the line of separation between the stationary and movable scales.

2. In a device of the class described, a movable scale under the control of the weight in the scale pan, and bearing a series of weight indications and a stationary scale substantially parallel to the movable scale and bearing a series of indications representing fractions of the units of the movable scale, the two series of indications being parallel to each other and to the line of separation between the stationary and movable scales.

3. In a device of the class described, a movable scale actuated by the weight imposed upon the scale pan and containing a series of larger weight indications only, a stationary scale parallel thereto past which the first mentioned scale moves and bearing a series of weight indications fractional with respect to the indications on the movable scale, the two series of indications being parallel to each other and to the line of separation between the stationary and movable scales.

4. In a device of the class described, a movable scale actuated by the weight imposed upon the scale pan and containing only larger weight indications, a stationary scale parallel thereto past which the first mentioned scale moves and bearing weight indications fractional with respect to the indications on the movable scale, the surfaces which bear the weight indications being substantially flush with each other.

5. In a device of the class described, a scale having a movable member, a rotary chart connected to the movable member for operation thereby carrying a series of larger weight indications only, a stationary scale parallel to the scale on the rotary chart past which the latter moves and bearing a series of weight indications which are fractional with respect to the indications on the movable scale the two series of indications being parallel to each other and to the line of separation between the stationary and movable scales.

In testimony whereof I hereunto set my hand in the presence of two witnesses.

EDMUND S. CHURCH.

Witnesses:
Louis B. Erwin,
H. F. Anderson.